(12) United States Patent
Chang et al.

(10) Patent No.: US 12,710,649 B2
(45) Date of Patent: Aug. 18, 2026

(54) VEHICLE DISPLAY SYSTEMS AND METHODS WITH MULTIFUNCTION HOLOGRAPHIC RLAD DEVICES

(71) Applicant: GM GLOBAL TECHNOLOGY OPERATIONS LLC, Detroit, MI (US)

(72) Inventors: Kai-Han Chang, Madison Heights, MI (US); Thomas A. Seder, Fraser, MI (US); Omer Tsimhoni, Bloomfield Hills, MI (US); Guy N. Kennerly, Southfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 190 days.

(21) Appl. No.: 18/823,937

(22) Filed: Sep. 4, 2024

(65) Prior Publication Data

US 2026/0063898 A1 Mar. 5, 2026

(51) Int. Cl.
*G02B 27/01* (2006.01)
*G02B 5/32* (2006.01)
*G02B 27/10* (2006.01)

(52) U.S. Cl.
CPC ........... *G02B 27/0103* (2013.01); *G02B 5/32* (2013.01); *G02B 27/1093* (2013.01); *G02B 2027/0112* (2013.01)

(58) Field of Classification Search
CPC ....... G03H 1/00; G02B 27/0101; B60K 35/23
USPC .......................................................... 359/630
See application file for complete search history.

(56) References Cited

U.S. PATENT DOCUMENTS 7,248,151 B2 7/2007 McCall
8,564,729 B2 * 10/2013 Hoetzer .............. B60R 11/0235 348/836
8,692,739 B2 * 4/2014 Mathieu ............... B60K 35/233 382/104
8,823,552 B1 9/2014 Raphael
9,052,865 B2 * 6/2015 Sun ...................... H04N 13/341
9,404,742 B2 8/2016 Huntzicker
9,684,168 B2 6/2017 Huntzicker
(Continued)

FOREIGN PATENT DOCUMENTS

DE 69912759 T2 9/2004
DE 102015104085 A1 9/2016
DE 102016117969 A1 3/2018

*Primary Examiner* — Lin Ye
(74) *Attorney, Agent, or Firm* — Quinn IP Law

(57) ABSTRACT

A holographic projection display system includes a cluster of lighting elements arranged in a fixed lighting array. The clustered lighting elements include a first set of light diodes emitting light of a first wavelength and each having a respective emission angle towards a reflective surface, and a second set of light diodes emitting light of a second wavelength and each having a respective emission angle towards the reflective surface. A multilayer holographic optical element (HOE) assembly is attached to the lighting cluster forward of the two light diode sets. The multilayer HOE assembly includes a stacked pair of mutually parallel holographic panels, including a first holographic panel recorded with multiple holographic patterns each optically configured to diffract the light wavelength emitted by the first light diodes, and a second holographic panel recorded with multiple holographic patterns each optically configured to diffract the light wavelength emitted by the second light diodes.

20 Claims, 4 Drawing Sheets

(56) References Cited

U.S. PATENT DOCUMENTS

| | | | | |
|---|---|---|---|---|
| 2010/0036717 | A1* | 2/2010 | Trest | G06Q 30/0251 705/14.1 |
| 2012/0062725 | A1 | 3/2012 | Wampler, II | |
| 2016/0027391 | A1* | 1/2016 | Gibson | G06F 3/1423 345/4 |
| 2017/0090089 | A1* | 3/2017 | Kim | G02B 6/0055 |
| 2019/0146216 | A1 | 5/2019 | Mourou et al. | |
| 2020/0050266 | A1 | 2/2020 | Yin | |
| 2022/0155860 | A1 | 5/2022 | Tzvieli et al. | |
| 2022/0357574 | A1* | 11/2022 | Chang | B60K 35/28 |
| 2024/0053608 | A1 | 2/2024 | Travers | |
| 2024/0142776 | A1 | 5/2024 | Sharma | |

* cited by examiner

VEHICLE DISPLAY SYSTEMS AND METHODS WITH MULTIFUNCTION HOLOGRAPHIC RLAD DEVICES

The present disclosure relates generally to display systems for motor vehicles. More specifically, aspects of this disclosure relate to digital projection display devices for presenting vehicle information and driving alerts to occupants of automobiles.

Most current production motor vehicles, such as the modern-day automobile, are erected with a rigid vehicle body—as either a body-on-frame or a unibody construction—that has an interior passenger compartment for seating and safeguarding the vehicle occupants. Mounted between the forward A-pillars of the vehicle body is a windshield (or "windscreen" in some countries) that prevents the unwanted ingress of wind, rain, and debris while providing an aerodynamically formed window through which the driver views the roadway. Located underneath the windshield and forward of the driver seat is a dashboard instrument panel (colloquially the "instrument cluster" or "IP") that contains an assortment of digital and electromechanical dials, gauges, meters, and indicators for relaying information about the vehicle to the driver. A vehicle telecommunications and information ("telematics") unit may be inset within the centerstack portion of the dashboard to provide occupants with an onboard computing device that provides a mixture of services including feedback and control for various in-vehicle subsystems.

To increase driver awareness of vehicle systems operation and ambient driving conditions, some modern vehicles supplement the telematics unit and IP with a head-up display (HUD) device with a transparent ("see through") display panel that displays information within the viewing envelope of the windshield. An automotive HUD is designed to present information within the operator's forward-driving field of view and, thus, reduce superfluous eye scanning and glance behavior at the instrument panel and center stack. Due to the innate costs and complexities of integrating a separate transparent display panel of an HUD, some vehicles instead use a reflected light emitting diode (LED) alert display (RLAD) to present warnings and notifications to drivers by projecting LED-source light onto an interior surface of the vehicle windshield. Current RLAD systems, however, are typically capable of projecting only basic geometric shapes in fixed colors and, thus, are limited in the types of information that can be displayed to the driver.

SUMMARY

Presented below are vehicle display systems with multifunction holographic RLAD devices, methods for manufacturing and methods for operating such vehicle display systems, and motor vehicles equipped with such display systems. By way of non-limiting example, a holographic RLAD device includes a fixed cluster of lighting elements, such as an intermixed series of red and green LEDs or laser diodes arranged in a one-dimensional (1D) or two-dimensional (2D) array. For a given color, each lighting element is set at a distinct emission angle, which may be achieved using light-turning prisms on top of the LEDs or angled reflectors behind the LEDs. A multilayer holographic optical element (HOE) is mounted in front of the cluster of lighting elements such that a reference beam emitted by each LED/laser diode passes through the multilayer HOE. In an example, the HOE consists essentially of two stacked and mutually parallel holographic panels, in which one layer is optically configured to diffract only light of a first wavelength (e.g., green) and the other layer is optically configured to diffract only light of a second wavelength (e.g., red). Each of the holographic layers is recorded with one or more hologram patterns that each generates a predefined alert icon when illuminated with a corresponding wavelength at a respective angle of incidence. Additional or alternative icons/patterns may be added to the holographic RLAD device module by replacing or adding a new holographic layer rather than having to replace the entire module.

Aspects of this disclosure are directed to digital projection display devices with multilayer holographic panel structures for projecting complex and irregular geometric icons. In an example, a holographic projection display system is presented for projecting images onto a reflective surface, such as the inboard surface of a windshield of an automobile. The holographic projection display system includes a cluster of lighting elements that is arranged in a predefined pattern and attached to a multilayer HOE assembly. The clustered lighting elements include at least two sets of light diodes: a first set of light diodes that emits light at a first wavelength and each has a respective emission angle towards a reflective surface, and a second set of light diodes that emits light at a second wavelength and each has a respective emission angle towards the reflective surface. The multilayer HOE assembly is located forward of the clustered light diodes and includes at least two holographic layers: a first holographic panel recorded with multiple holographic patterns each optically configured to diffract the light wavelength emitted by the first set of light diodes, and a second holographic panel attached to the first holographic panel and recorded with multiple holographic patterns each optically configured to diffract the light wavelength emitted by the second set of light diodes.

Additional aspects of this disclosure are directed to motor vehicles equipped with multifunction holographic RLAD devices. As used herein, the terms "vehicle" and "motor vehicle" may be used interchangeably and synonymously to include any relevant vehicle platform, such as passenger vehicles, commercial vehicles, industrial vehicles, off-road and all-terrain vehicles (ATV), motorcycles, farm equipment, aircraft, spacecraft, watercraft, etc. In an example, a motor vehicle includes a vehicle body with a passenger compartment, multiple road wheels attached to the vehicle body (e.g., via corner modules coupled to a unibody or body-on-frame chassis), and other standard original equipment. A prime mover, which may be in the nature of an electric traction motor and/or an internal combustion engine (ICE) assembly, is located inside the vehicle body and drives the road wheel(s) to propel the vehicle. It is envisioned that disclosed display designs and features may be employed in vehicular and non-vehicular applications alike.

Continuing with the discussion of the foregoing example, the vehicle is also equipped with a holographic projection display system that is mounted inside the passenger compartment (e.g., on or in the dashboard, rearview mirror, or roof headliner). The holographic projection display system includes a cluster of lighting elements that is arranged in a fixed light array and attached to a multilayer HOE assembly. The clustered lighting elements include multiple sets of light diodes, such as a first set of light diodes that emit light at a first wavelength and each has a respective emission angle towards the vehicle windshield, and a second set of light diodes that emit light at a second wavelength, distinct from the first wavelength, and each has a respective second emission angle towards the windshield. The emission angles of the first light diodes are distinct from one another, and the emission angles of the second light diodes are distinct from one another.

The multilayer HOE assembly is located forward of the light diode sets and includes multiple holographic layers, such as a first holographic panel stacked on and mounted to a second holographic panel. The first holographic panel is recorded with multiple holographic patterns, each of which is optically configured to diffract only the light wavelength emitted by the first light diodes at their respective emission angles. Likewise, the second holographic panel is recorded with multiple holographic patterns, each of which is optically configured to diffract only the light wavelength emitted by the second light diodes emitted at their respective emission angles.

Aspects of this disclosure are also directed to methods for manufacturing and methods for operating any of the herein described holographic projection display devices, vehicle display systems, and motor vehicles. In an example, a method is presented for assembling a holographic projection display system for projecting images onto a reflective surface. This representative method includes, in any order and in any combination with any of the above and below disclosed options and features: arranging a cluster of lighting elements in a predefined pattern, the cluster of lighting elements including: a plurality of first light diodes of a first light wavelength and each having a respective first emission angle towards the reflective surface, and a plurality of second light diodes of a second light wavelength and each having a respective second emission angle towards the reflective surface; and attaching a multilayer holographic optical element assembly to the cluster of lighting elements forward of the pluralities of first and second light diodes, the multilayer HOE assembly including: a first holographic panel recorded with one or more first holographic patterns each optically configured to diffract the first light wavelength of the first light diodes emitted at one or more of the respective first emission angles, and a second holographic panel attached to the first holographic panel, the second holographic panel recorded with one or more second holographic patterns each optically configured to diffract the second light wavelength of the second light diodes emitted at one or more of the respective second emission angles.

For any of the disclosed vehicles, systems, and methods, at least one of the holographic patterns recorded in the first holographic panel may be optically configured to only diffract light of the first wavelength emitted at the respective emission angle of a single one of the first light diodes. In the same vein, at least one of the holographic patterns recorded in the second holographic panel may be optically configured to only diffract light at the second wavelength emitted at the respective emission angle of a single one of the second light diodes. As another option, at least one of the holographic patterns recorded in the first holographic panel may be optically configured to only diffract light of the first wavelength emitted at the respective emission angles of two of the first light diodes. Likewise, at least one of the holographic patterns recorded in the second holographic panel may be optically configured to only diffract light of the second wavelength emitted at the respective emission angles of two of the second light diodes. In this example, the respective emission angles of the two first light diodes are distinct from each other, and the respective emission angles of the two second light diodes are distinct from each other.

For any of the disclosed vehicles, systems, and methods, the second holographic panel may include one or more optically transparent regions that lack a holographic pattern; each optically transparent region may overlap one of the holographic patterns recorded in the first holographic panel. As a further option, one of the first holographic patterns may only diffract the light wavelength emitted at the respective emission angle of a respective first light diode, and one of the second holographic patterns may only diffract the light wavelength emitted at the respective emission angle of a respective second light diode. In this instance, the first holographic pattern overlaps the second holographic pattern such that light diffracted by the overlapping holographic patterns combine to project a combined image of a third light wavelength (e.g., yellow) distinct from the first and second wavelengths (e.g., red and green). Moreover, the respective emission angle of the respective first light diode may be distinct from the respective emission angle of the respective second light diodes.

For any of the disclosed vehicles, systems, and methods, an optically clear adhesive layer, a mounting bracket, and/or a set of fasteners may be used to mount the first holographic panel to the second holographic panel. As a further option, the holographic projection display system may employ multiple light prisms or reflectors, each of which is located adjacent a respective one of the light diodes to direct a reference beam emitted therefrom at the diode's respective emission angle. As yet another option, the multiple sets of light diodes may be mounted in a fixed light array that contains either a single row (1D) of diodes or multiple rows (2D) of diodes. The sets of light diodes may be embodied as light emitting diodes, laser diodes, or a combination of both. As another option, the first holographic panel may be mounted onto and substantially parallel with the second holographic panel. Each of the holographic panels may be a substantially flat and optically transparent single-piece panel structure.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
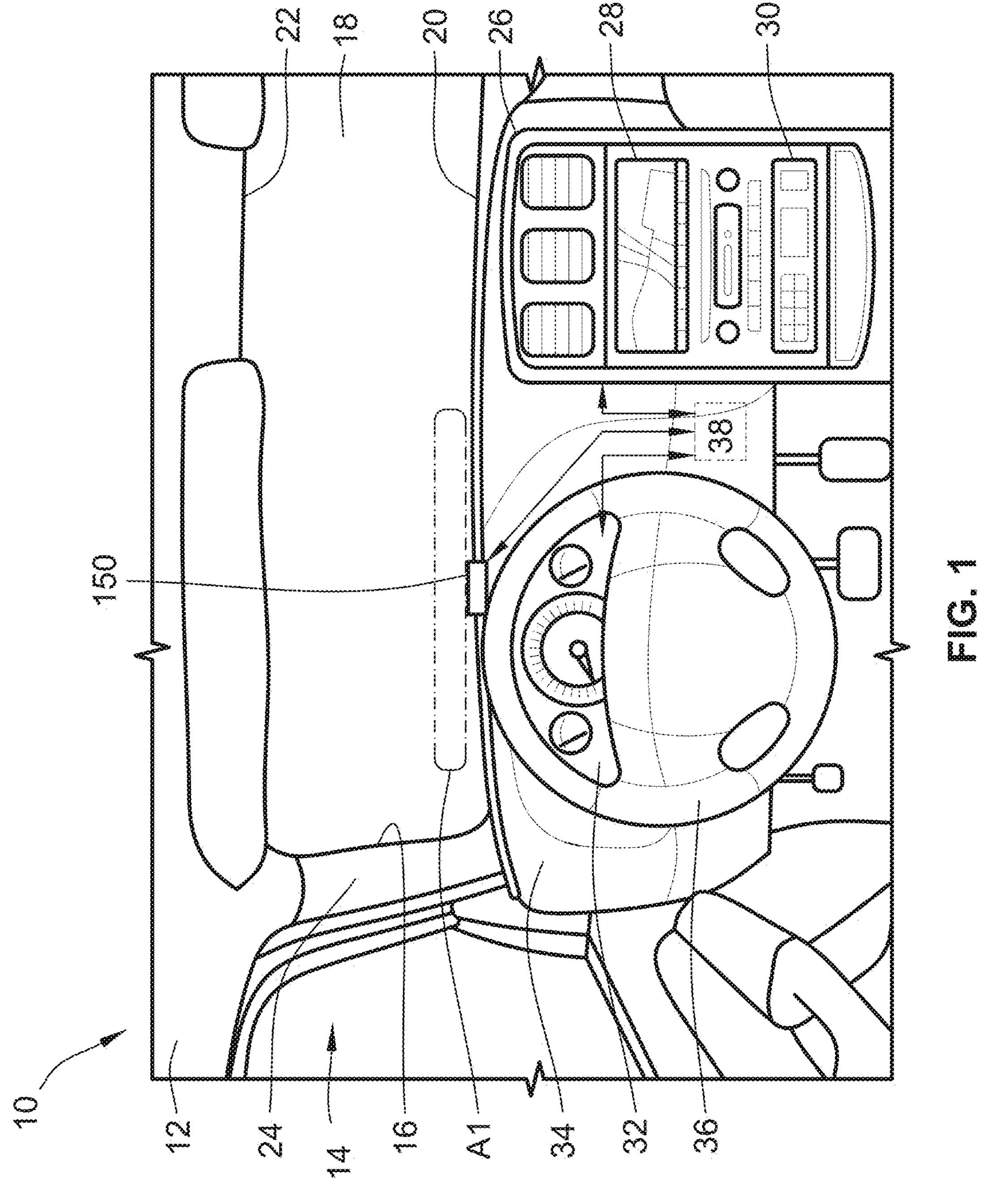
FIG. 1 is a forward-facing, perspective-view illustration of a portion of a passenger compartment of a representative motor vehicle with a multimodal information display system having a multifunction holographic RLAD device in accordance with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style passenger automobile. The illustrated automobile 10—also referred to herein as "motor vehicle" or "vehicle" for short—is merely an exemplary application with which aspects of this disclosure may be practiced. In the same vein, utilization of the present concepts for projecting information onto a front windshield of an automobile should be appreciated as a non-limiting implementation of disclosed features. As such, it will be understood that aspects and features of this disclosure may be effected to project information onto other vehicle surfaces (e.g., rear windows and back glass, side door windows, etc.), utilized for any logically relevant type of motor vehicle, and implemented for both automotive and non-automotive applications alike. Moreover, only select components of the motor vehicle and vehicle display system are shown and described in detail herein. Nevertheless, the vehicles and systems discussed below may include numerous additional and alternative features, and other available peripheral hardware, for carrying out the various methods and functions of this disclosure.

To protect vehicle occupants from inclement weather and road debris, a front windshield 18 is located between two A-pillars 24 at a forward end of a passenger compartment 14 of a vehicle body 12 of the automobile 10. In accord with the illustrated example, the front windshield 18 is sealingly fastened, e.g., via a bonding agent and a window gasket or polymeric weather stripping, to a front window frame 16. A lower edge of the front window frame 16 is delineated by a dash panel cowl 20, whereas an upper edge is delineated by a roof rail 22 and the two lateral edges of the frame 16 are delineated by a pair of A-pillars 24 (only one of which is visible; a second mirrored counterpart is located on the opposite side of the window frame 16). Also present within the vehicle passenger compartment 14 is a control-bearing centerstack 26 that houses a vehicle telematics unit, which is represented in FIG. 1 by an interactive touchscreen video display device 28 and a user-input button panel 30. Touchscreen video display 28 is operable to receive user inputs via soft-touch controls and to concurrently display images, texts, and video-based content. A digital instrument panel (IP) 32 is housed within a front dashboard 34 forward of a steering wheel 36 and displays gauges, instrumentation, and controls for monitoring and regulating selected operations of the vehicle 10 (e.g., speedometer, tachometer, odometer, fuel gauge, engine temperature gauge, warning lights, etc.). It should be appreciated that disclosed display devices and attendant features are not per se limited to the specific passenger compartment layout presented in FIG. 1.

Recessed into a top surface of the front dashboard 34 is a multifunction holographic RLAD device 150 that is part of an in-vehicle Enhanced Display System (EDS) for dynamically presenting information to vehicle occupants for enhancing operation of the automobile 10. For instance, the holographic RLAD device 150 is operable to selectively project graphical images and data onto the front windshield 18 to present vehicle-related and non-vehicle-related information of various forms, including real-time vehicle systems operation, ambient driving conditions, infotainment features, personalized occupant-specific data, etc. The holographic RLAD device 150, electronic touchscreen video display 28, button panel 30, and digital IP 32 communicate—wired or wirelessly—with a programmable electronic control unit (ECU) 38. Vehicle ECU 38 may systematically monitor various sensors, system components, and/or other relevant inputs, both manual and automated, and identify information based on these monitored inputs that will be relayed to the vehicle occupants or to passing pedestrians, vehicles, etc., and determine a graphical representation of the selected information. This ECU 38 may communicate directly with various systems, subsystems, and components, or the ECU 38 may alternatively or additionally communicate over a distributed computing network, such as a LAN/CAN system, a satellite system, the Internet, etc. Various vehicle sensors may be prompted to monitor vehicle speed, engine speed, transmission state, engine coolant temperature, fuel level and economy, oil level, tire pressure, wheel slip, battery state-of-charge (SOC), battery range, mileage, navigation information, and/or any other parameters representative of vehicle operation.

Front windshield unit 18 functions as both an aerodynamic, shatter-resistant windscreen and a reflective display surface onto which alerts, icons and other data are projected by the holographic RLAD device 150. Specifically, the RLAD display device 150 is capable of dynamically displaying images on the front windshield 18 superimposed within an occupant's forward-facing field of view through the windshield 18. An EDS graphics engine, embodied as a dedicated software application or a discrete control module within the ECU 38, for example, includes display software that is memory-stored as processor-executable code that translates data and user requests into graphical representations of desired information. To provide "see through" functionality, the front windshield 18 remains sufficiently transparent to allow occupants of the vehicle 10 to clearly see objects outside of the passenger compartment 14 through the front windshield 18 while select images are displayed by the RLAD display device 150 within one or more inset viewing regions. By way of non-limiting example, the front windshield unit 18 of FIG. 1 contains a transparent display areas A1 onto which are projected images and data within a driver's field of vision. It is certainly within the scope and spirit of this disclosure for the front windshield unit 18 to provide additional or alternative transparent display areas, any or all of which may comprise differing shapes, sizes, and/or locations from that shown in the drawings.

Figure 2:
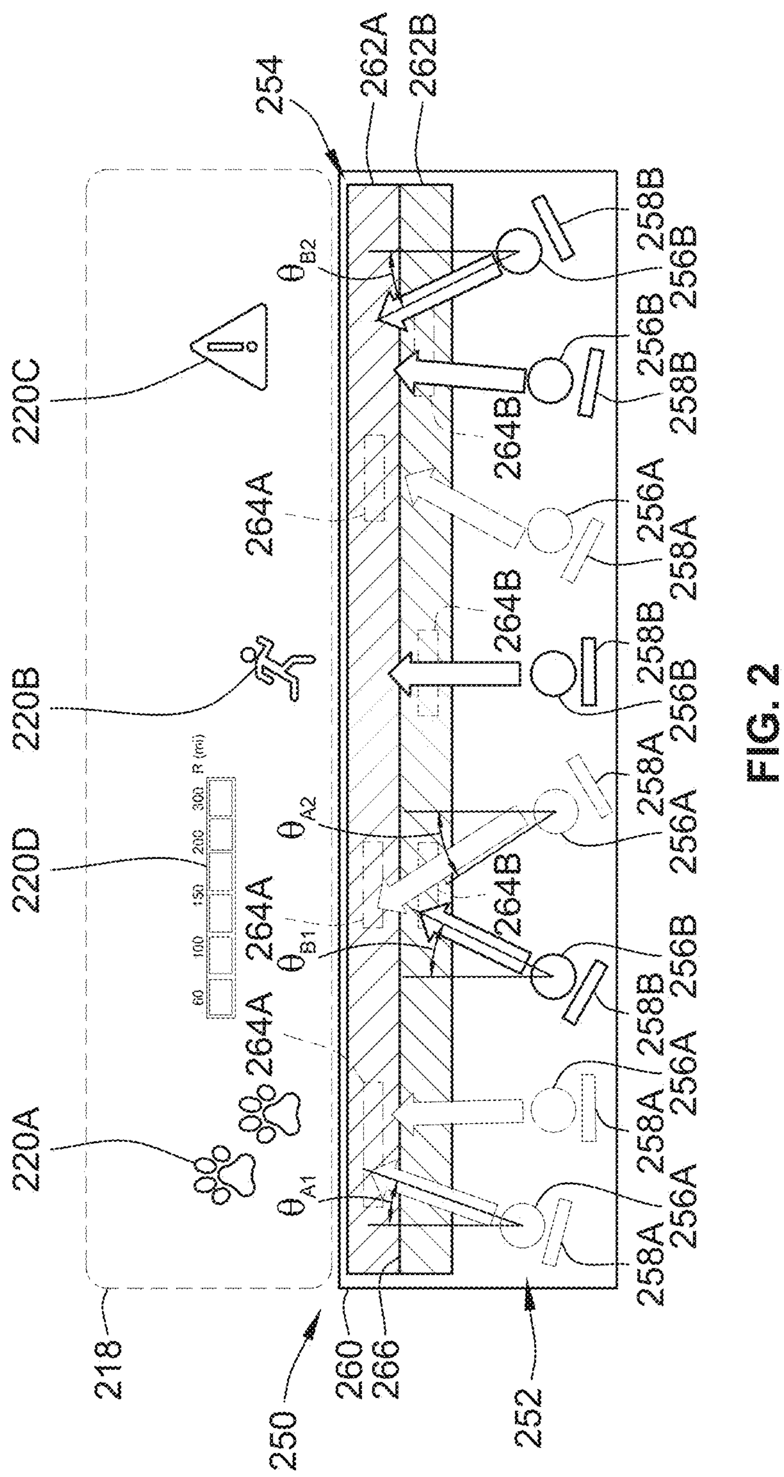
FIG. 2 is a schematic illustration of a representative holographic projection display system in accordance with aspects of the present disclosure.
Figure 3:
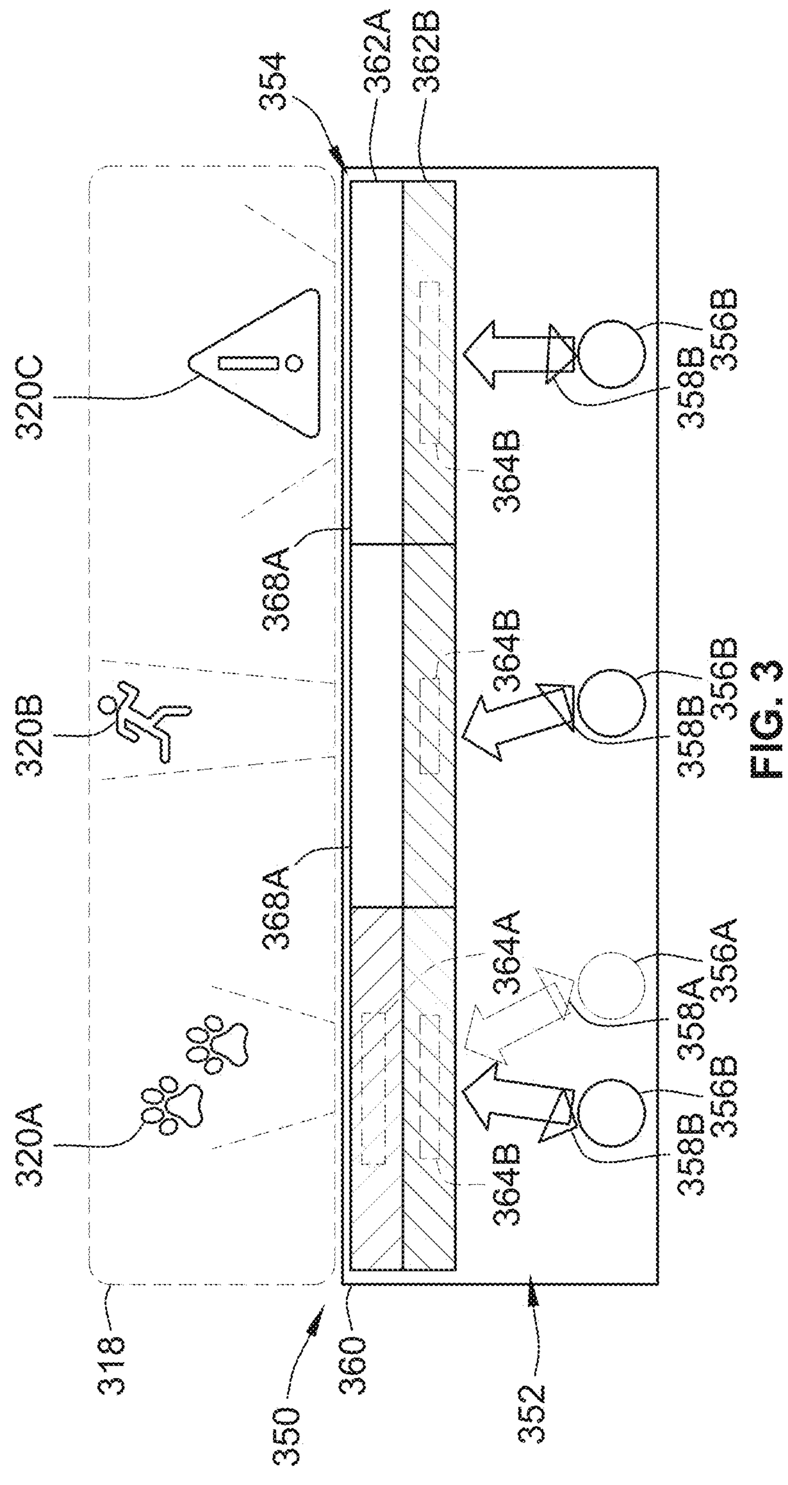
FIG. 3 is a schematic illustration of another representative holographic projection display system in accordance with aspects of the present disclosure.

FIGS. 2 and 3 present two representative examples of holographic projection display systems 250 and 350 that may be embodied as a multifunction holographic RLAD device 150 for dynamically displaying information to a driver of an automobile 10 of FIG. 1. Although differing in appearance, it is envisioned that any of the options and features described herein with reference to the display system 250 of FIG. 2 may be incorporated, singly or collectively, into the display system 350 of FIG. 3, and vice versa. By way of example, and not limitation, both of the display systems 250, 350 may be typified by two interoperable subsystems: (1) a mixed cluster of lighting elements 252 and 352 arranged in a preset light pattern; and (2) a multilayer holographic optical element (HOE) assembly 254 and 354 that is fixedly attached to the light cluster 252, 352 and located forward of the light diodes 256A, 256B, 356A and 356B in the light cluster 252, 352. Each cluster of lighting elements 252, 352 includes at least two distinct sets of light diodes: (1) a primary hued (first) set of (first) light diodes 256A, 356A that share a common (first) light wavelength (e.g., green); and (2) an auxiliary hued (second) set of light diodes 256B, 356B that share another common (second) light wavelength (e.g., red). It may be desirable that the light diodes 256A, 256B, 356A, 356B in a given light cluster 252, 352 be mounted in a fixed light array with either a single rectilinear row (1D) of diodes (FIG. 3) or multiple rectilinear rows and columns (2D) of diodes (FIG. 2). Alternatively, the clustered lighting elements 252, 352 may be arranged in a 3D array of diodes and/or in a pivotable/translatable array of diodes. It is also envisioned that each of the light diodes 256A, 256B, 356A and 356B may take on any suitable lighting element form factor, including a single-color LED, an RGB LED, an SMD LED, a semiconductor laser diode, a fiberoptic laser, etc.

Unlike conventional RLAD and HUD system configurations, each light diode 256A, 356A in the primary light diode set may have a respective (first) light emission angle (e.g., first and second primary beam angles $\theta_{A1}$ and $\theta_{A2}$) that is directed towards a reflective surface 218 and is distinct from the light emission angles of the other light diodes 256A, 356A in that set. For instance, all four of the green light diodes 256A in FIG. 2 have respective beam angles that are distinct from one another, and all four of the red light diodes 256B in FIG. 2 have respective beam angles that are distinct from one another. In the same vein, each light diode 256B, 356B in the auxiliary light diode set has a respective (second) light emission angle (e.g., first and second auxiliary beam angles $\theta_{B1}$ and $\theta_{B2}$) that is distinct from the light emission angles of the other light diodes 256B, 356B in that set. Although shown in FIG. 2 with a total of eight (8) diodes—four green light diodes 256A and four red light diodes 256B—and in FIG. 3 with a total of four (4) diodes—one green light diode 356A and three red light diodes 356B, the mixed cluster of lighting elements 252, 352 may include any number and combination of light diodes apropos to an intended application.

Each lighting element may be set at its distinct emission angle using, for example, a light-turning prism mounted in front of the lighting element or an angled light reflector mounted behind the lighting element. In FIG. 2, for example, a primary (first) set of light reflectors 258A is packaged inside a protective display system housing 260 with the lighting element cluster 252 and HOE assembly 254. Each of these light reflectors 258A is located immediately behind or circumscribes a respective light diode 256A and reflects a reference light beam emitted therefrom at the respective emission angle of that diode 256A. An auxiliary (second) set of light reflectors 258B is also packaged inside the display system housing 260; each light reflector 258B is located immediately behind or circumscribes a respective light diode 256B and reflects a reference light beam emitted therefrom at the respective emission angle of that diode 256B.

Comparatively, FIG. 3 shows a primary (first) set of light prisms 358A that is packaged inside a protective display system housing 360 with the lighting element cluster 352 and HOE assembly 354. Each of these light prism 358A is located immediately forward of or at a desired lateral offset to a respective light diode 356A and refracts a reference light beam emitted therefrom at the respective emission angle of that diode 356A. An auxiliary (second) set of light prisms 358B is also packaged inside the display system housing 360; each light prism 358B is located immediately forward of or at a desired lateral offset to a respective light diode 356B and refracts a reference light beam emitted therefrom at the respective emission angle of that diode 356B. It is also envisioned that the display systems 250, 350 may omit some or all of the illustrated prisms and deflectors, instead individually orienting each lighting element at a distinct beam angle.

The multilayer HOE assembly 254, 354 is shown interposed between the lighting element cluster 252, 352 and the reflective surface 218, 318 such that a reference beam emitted by each light diode 256A, 256B, 356A, 356B passes through the HOE assembly 254, 354 and projects one or more alert icons 220A-220C and 320A-320C onto the reflective surface 218, 318. Each HOE assembly 254, 354 includes at least two holographic layers: a primary (first) holographic panel 262A and 362A that is recorded with one or more primary (first) holographic patterns 264A, 364A; and (2) an auxiliary (second) holographic panel 262B and 362B that is adjacent the primary holographic panel 262A, 362A and recorded with one or more auxiliary (second) holographic patterns 264B, 364B. In accord with the illustrated example, each of the holographic panels 262A, 262B, 362A, 362B may be fabricated as a substantially flat and optically transparent single-piece panel structure from a recordable photosensitive material (e.g., photopolymerizable monomers and glass). As a further option, the primary holographic panel 262A, 362A may be physically coupled to the auxiliary holographic panel 262B, 362B, e.g., via an optically clear adhesive layer 266, a mounting bracket, a set of fasteners, etc. For instance, the primary holographic panel 262A of FIG. 2 is shown mounted directly onto and substantially parallel with the auxiliary holographic panel 262B.

With continuing reference to FIGS. 2 and 3, each of the holographic patterns 264A, 364A recorded to the primary holographic panels 262A, 362A is optically configured to diffract the shared light wavelength (e.g., green) emitted by the primary light diodes 256A, 356A at their respective emission angles. In the same vein, each of the auxiliary holographic patterns 264B, 364B is optically configured to diffract the shared light wavelength (e.g., red) emitted by the auxiliary light diodes 256B, 356B at their respective emission angles. The holographic panels 262A, 362A, 262B, 362B may be formed, in whole or in part, from photosensitive material that locally changes its internal refractive index and/or light absorption coefficient depending on the incident light intensity. An interference pattern formed by the interference between light from reference beam and light from object, both coherent or partially coherent, may illuminate the photosensitive material and creates a variation of refractive index/absorbance on the panel. The interference pattern may be different for different combinations of reference beam(s) and, hence, the distribution of refractive index or absorbance change on the panel.

Each recorded holographic pattern may diffract the light wavelength emitted by a single one of the lighting elements. The rightmost holographic pattern 364B of FIG. 3, for example, may only diffract the (red) light wavelength emitted by the rightmost auxiliary light diode 356B at its respective light emission angle (e.g., +5° from vertical), whereas the center holographic pattern 364B of FIG. 3 only diffracts the (red) light wavelength emitted by the center auxiliary light diode 356B at its respective light emission angle (e.g., −15° from vertical). In other words, neither of these holographic patterns 364B is optically configured to diffract light of a different wavelength or light of a different angle. As a point of comparison, the leftmost primary holographic pattern 364A of FIG. 3 may only diffract the (green) light wavelength emitted by the leftmost primary light diode 356A at its respective light emission angle (e.g., −25° from vertical), and not the (red) light wavelength emitted by the leftmost auxiliary light diode 356B. Conversely, the leftmost auxiliary holographic pattern 364B of FIG. 3 may only diffract the (red) light wavelength emitted by the leftmost auxiliary light diode 356B at its respective light emission angle (e.g., +10° from vertical), and not the (green) light wavelength emitted by the leftmost primary light diode 356A.

Each recorded holographic pattern may diffract the light wavelength emitted by a select combination of the lighting elements. For instance, the leftmost holographic pattern 264A of FIG. 2 may only diffract the (green) light wavelength emitted by the two left-side primary light diodes 256A at their respective light emission angles (e.g., projecting a larger and brighter animal alert icon 220A). This holographic pattern 264A does not diffract light of a different wavelength (red) or light of a different angle (irrespective of color). The rightmost holographic pattern 264B of FIG. 2, on the other hand, may only diffract the (red) light wavelength emitted by the two right-side auxiliary light diodes 256B at their respective light emission angles (e.g., projecting a larger and brighter yield alert icon 220C). This holographic pattern 264B does not diffract light of a different wavelength (green) or light of a different angle (irrespective of color). As a further option, one or both of the holographic layers may include one or more optically transparent regions, such as transparent windows 368A of the primary holographic panel 362A in FIG. 3, that lack a holographic pattern and overlap one or more of the holographic patterns of the neighboring holographic panel, which may enable a brighter projected icon.

Select recorded holographic patterns may optically align with each other to combine their diffracted light and thereby generate icons of a different wavelength. As noted above, the leftmost primary holographic icon 364A of FIG. 3 may only diffract the (green) light wavelength emitted by the leftmost primary light diode 356A at its respective light emission angle, and the leftmost auxiliary holographic icon 364B of FIG. 3 may only diffract the (red) light wavelength emitted by the leftmost auxiliary light diode 356B at its respective light emission angle. However, the two leftmost holographic patterns 364A, 364B of FIG. 3 are optically aligned, e.g., with the auxiliary icon 364B interposed between the primary icon 364A and the two mated light diodes 356A, 356B, such that reference beams emitted therefrom pass through both of the leftmost holographic patterns 364A, 364B. In so doing, light diffracted by these optically overlapping holographic patterns 364A, 364B combine to emit an enlarged alert icon 320A of a new (yellow) light wavelength that is distinct from the wavelengths of the two mated light diodes 356A, 356B.

An attendant advantage of disclosed holographic projection display systems over existing RLAD devices is the ability to display complex icons and text rather than just basic geometric shapes (e.g., a reflection of flashing lights shaped as dots, triangles, octagons, etc.). Attendant advantages of disclosed holographic projection display systems over existing HUD devices may include reduced part costs and packaging space. Current supplier solutions that use a masked approach to provide static alerts have a low light efficiency; disclosed holographic projection display systems enable increased light efficiencies and, thus, may provide boosted icon brightness (e.g., at least about 4800 nits). The use of angular and wavelength multiplexing of holograms may be employed to enable disclosed holographic projection display systems to achieve plural number of alerts. Plural number of alerts may also be achieved by zoning the HOE with separated light sources.

Figure 4:
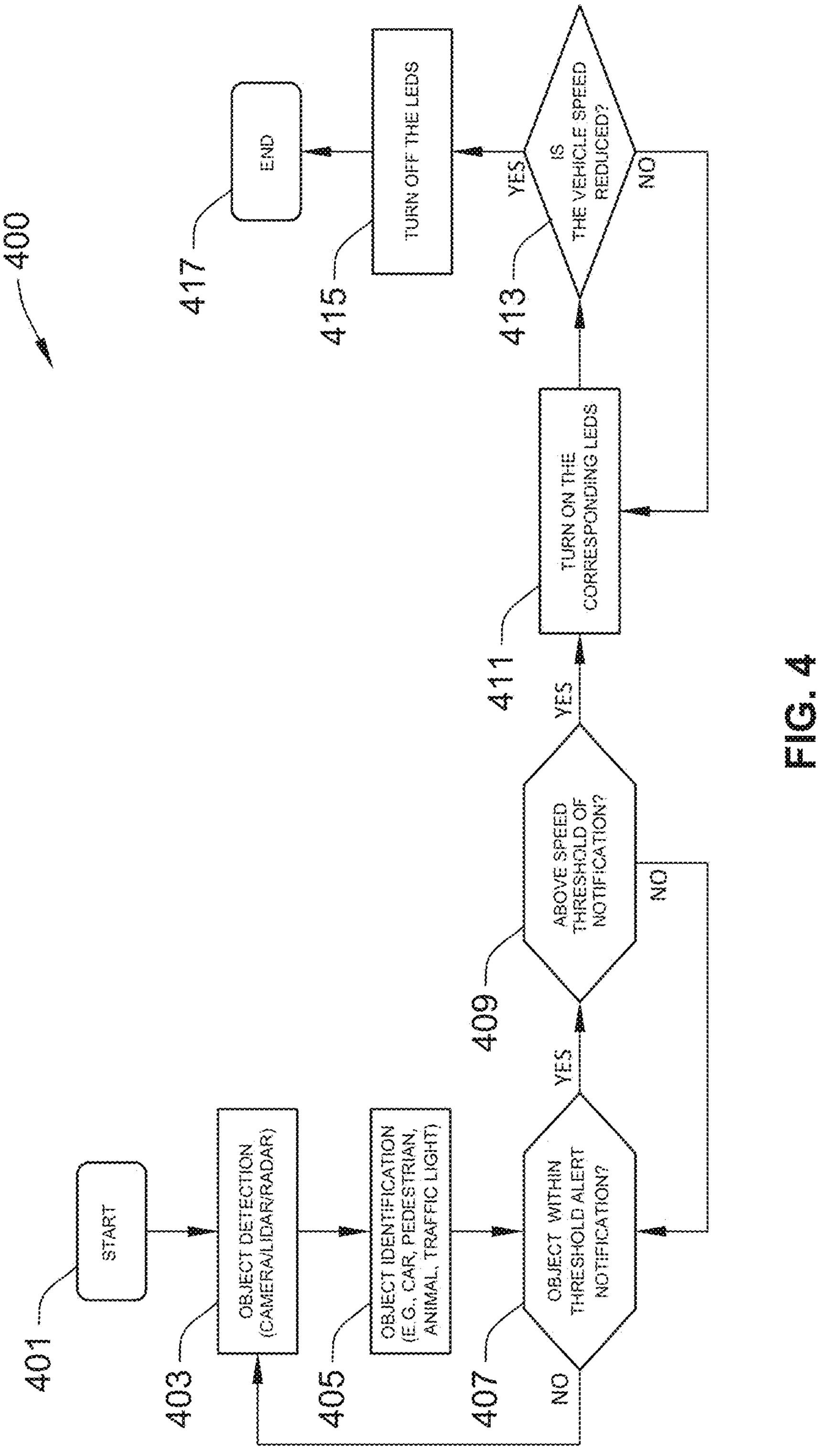
FIG. 4 is a flowchart illustrating a representative display system control protocol for operating a multifunction holographic RLAD device, which may correspond to non-transient, memory-stored instructions that are executable by a resident or remote microprocessor, control module, logic circuit, central controller, or other integrated circuit (IC) device or network of circuits/modules/microprocessors/controllers/IC devices (collectively "controller") in accordance with aspects of the disclosed concepts.

With reference next to the flowchart of FIG. 4, an improved method or control protocol for operating an in-cabin display system of a motor vehicle, such as automobile 10 of FIG. 1, with a holographic RLAD device, such as display systems 250 and 350 of FIGS. 2 and 3, is generally described at 400 in accordance with aspects of the present disclosure. Some or all of the operations illustrated in FIG. 4 and described in further detail below may be representative of an algorithm that corresponds to non-transitory, processor-executable instructions that are stored, for example, in main or auxiliary or remote memory (e.g., resident vehicle memory device and/or remote cloud computing service database). These instructions may be executed, for example, by a microprocessor, central controller, dedicated control module, logic circuit, or other module or device or network of controllers/modules/devices (e.g., resident vehicle ECU 38 of FIG. 1 and/or remote server-class cloud computing terminal) to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 400 begins at START terminal block 401 of FIG. 4 with memory-stored, processor-executable instructions for initializing a holographic projection display control protocol for a motor vehicle. This routine may be initialized in real-time, near real-time, continuously, systematically, sporadically, and/or at predefined time intervals, for example, each 10 or 100 milliseconds during operation of the motor vehicle 10. As yet another option, terminal block 401 may initialize responsive to a user command prompt (e.g., via telematics input controls 28, 30), a resident vehicle controller prompt (e.g., from ECU 38), or a broadcast prompt signal received from a centralized back-office (BO) vehicle services system (e.g., from cloud host service). In one example, the method 400 may automatically initialize responsive to a key-on event in which a driver of the vehicle 10 depresses a start ignition button and, in tandem, shifts the vehicle 10 into drive (D) or low-gear (L1/L2). Upon completion of some or all of the control operations presented in FIG. 4, method 400 may advance to END terminal block 417 and temporarily terminate or, optionally, may loop back to terminal block 401 and run in a continuous loop (e.g., until the vehicle 10 is shifted back into park (P) and or keyed-off).

Advancing from terminal block 401 to OBJECT DETECTION process block 403, method 400 detects a target object, such as a vehicle, pedestrian, roadway obstruction, hazard, or animal forward of the vehicle 10, using any one or more of a networked array of on-vehicle sensing devices (e.g., cameras, RADAR array, LiDAR detector, capacitive sensors, etc.). Responsive to detection of a target object, method 400 automatically executes OBJECT IDENTIFICATION process block 405 to categorize and track the detected object. Method 400 thereafter proceeds to THRESHOLD DISTANCE decision block 407 to determine whether or not a target distance to the target object is less than a predefined threshold distance at which an alert is triggered for that type of target object (e.g., 100 ft. for pedestrian or 30 ft. for vehicle). If not (Block 407=NO), method 400 may loop back to process block 403 and continue scanning for oncoming target objects.

Upon determining that the target distance to the target object is less than the threshold alert distance (Block 407=YES), method 400 may responsively execute THRESHOLD SPEED decision block 409 to determine whether or not a current vehicle speed of the host vehicle meets or exceeds a predefined threshold alert speed at which an alert is triggered (e.g., ≥25 miles per hour (MPH)). If not (Block 409=NO), method 400 may loop back to process block 405 and continue to track the detected target object. Upon determining that the host vehicle's current speed is equal to or greater than the threshold alert speed (Block 409=YES), method 400 may responsively execute HOLOGRAPHIC ALERT process block 411 and activate the holographic projection display system (e.g., RLAD device 150 of FIG. 1), including illuminating the corresponding LED or LEDs associated with the holographic alert icon corresponding to the detected target object.

After activating the holographic projection display system, method 400 may advance to CONTINUED HAZARD decision block 413 to determine whether or not the detected target object is no longer a potential hazard. For instance, method 400 may determine whether or not the host vehicle speed has been reduced to below the threshold alert speed and/or the target distance to the target object is now greater than the threshold alert distance and/or the target object is no longer detected. Upon determining that the target object continues to be a potential hazard (Block 413=YES), method 400 may loop back to process block 411 and continue displaying the holographic alert icon corresponding to the detected target object (which may then be enlarged, brightened, flashed, or accompanied with an audible or tactile alert). When the target object is no longer a potential hazard (Block 413=YES), method 400 may responsively execute DISABLE HOLOGRAPHIC ALERT process block 415 and deactivate the LED(s) or LEDs for the holographic alert icon corresponding to the detected target object. Method 400 may thereafter loop back to process block 403 or may proceed to terminal block 417 and temporarily terminate.

To create a projected alert icon with a color other than that of the individual lighting elements (e.g., yellow icon from green and red LEDs), the desired alert icon pattern is separately recorded in each HOE film designated for the individual layer, the film layers are laminated together with the recorded icon patterns optically overlapping each other, and each layer is illuminated with a corresponding reconstruct beam that is the same as reference beam. It is envisioned that a projected icon may be configured as an analog showing of speed, such as a row of horizontally aligned blocks, each of which corresponds to a respective vehicle speed (e.g., leftmost block=5 mph, second-from-left block=10 mph, third-from-left block=15 mph, etc.). As another example implementation, a projected icon may be configured as an analog showing of delta from set speed (e.g., leftmost block=+1-5 mph, second-from-left block=+6-10 mph, third-from-left block=+11-15 mph, etc.). In another example implementation, a projected icon may be configured as an analog showing of fuel level (e.g., leftmost block=2 gallons remaining, second-from-left block=4 gallons remaining, third-from-left block=4 gallons remaining, etc.) or a battery charge level alert 220D (e.g., leftmost block=60 mile (mi) range (R) remaining, second-from-left block=100 mi R remaining, third-from-left block=150 mi R, etc.).

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A holographic projection display system for projecting images onto a reflective surface, the holographic projection display system comprising:
- a cluster of lighting elements arranged in a predefined pattern, the cluster of lighting elements including:
  - a plurality of first light diodes of a first light wavelength and each having a respective first emission angle towards the reflective surface, and
  - a plurality of second light diodes of a second light wavelength and each having a respective second emission angle towards the reflective surface; and
- a multilayer holographic optical element (HOE) assembly attached to the cluster of lighting elements forward of the pluralities of first and second light diodes, the multilayer HOE assembly including:
  - a first holographic panel recorded with a plurality of first holographic patterns each optically configured to diffract the first light wavelength of the first light diodes emitted at one or more of the respective first emission angles, and
  - a second holographic panel attached to the first holographic panel, the second holographic panel recorded with a plurality of second holographic patterns each optically configured to diffract the second light wavelength of the second light diodes emitted at one or more of the respective second emission angles.

2. The holographic projection display system of claim 1, wherein one of the first holographic patterns only diffracts the first light wavelength emitted at the respective first emission angle of a respective one of the first light diodes, and one of the second holographic patterns only diffracts the second light wavelength emitted at the respective second emission angle of a respective one of the second light diodes.

3. The holographic projection display system of claim 1, wherein the second holographic panel includes an optically transparent region lacking any holographic patterns and overlapping one of the first holographic patterns of the first holographic panel.

4. The holographic projection display system of claim 1, wherein one of the first holographic patterns only diffracts the first light wavelength emitted at the respective first emission angles of two of the first light diodes, and one of the second holographic patterns only diffracts the second light wavelength emitted at the respective second emission angles of two of the second light diodes.

5. The holographic projection display system of claim 4, wherein the respective first emission angles of the two of the first light diodes are distinct from each other, and the respective second emission angles of the two of the second light diodes are distinct from each other.

6. The holographic projection display system of claim 1, wherein:
- one of the first holographic patterns only diffracts the first light wavelength emitted at the respective first emission angle of a respective one of the first light diodes,
- one of the second holographic patterns only diffracts the second light wavelength emitted at the respective second emission angle of a respective one of the second light diodes, and
- the one of the first holographic patterns overlaps the one of the second holographic patterns such that light diffracted by the overlapping holographic patterns combine to emit an image of a third light wavelength distinct from the first and second wavelengths.

7. The holographic projection display system of claim 5, wherein the respective first emission angle of the respective one of the first light diodes is distinct from the respective second emission angle of the respective one of the second light diodes.

8. The holographic projection display system of claim 1, further comprising an optically clear adhesive layer mounting the first holographic panel to the second holographic panel.

9. The holographic projection display system of claim 1, further comprising:
- a plurality of first light prisms or reflectors each located adjacent a respective one of the first light diodes and configured to direct a first reference beam emitted therefrom at the respective first emission angle; and
- a plurality of second light prisms or reflectors each located adjacent a respective one of the second light diodes and configured to direct a second reference beam emitted therefrom at the respective second emission angle.

10. The holographic projection display system of claim 1, wherein the predefined pattern includes the pluralities of first and second light diodes mounted in a fixed light array with a single row or multiple rows of diodes.

11. The holographic projection display system of claim 1, wherein each of the first and second light diodes is a light emitting diode and/or a laser diode.

12. The holographic projection display system of claim 1, wherein the first holographic panel is mounted onto and substantially parallel with the second holographic panel.

13. The holographic projection display system of claim 1, wherein each of the first and second holographic panels is a substantially flat and optically transparent single-piece panel structure.

14. A motor vehicle, comprising:

a vehicle body including a passenger compartment and a vehicle windshield;

a plurality of road wheels attached to the vehicle body; and a holographic projection display system mounted inside the passenger compartment, the holographic projection display system including:

a cluster of lighting elements arranged in a fixed light array, the cluster of lighting elements including multiple first light diodes of a first light wavelength and each having a respective first emission angle towards the vehicle windshield, and multiple second light diodes of a second light wavelength, distinct from the first wavelength, and each having a respective second emission angle towards the windshield, the first emission angles of the first light diodes being distinct from one another, and the second emission angles of the second light diodes being distinct from one another; and a multilayer holographic optical element (HOE) assembly attached to the cluster of lighting elements forward of the first and second light diodes, the multilayer HOE assembly including a first holographic panel stacked on and mounted to a second holographic panel, the first holographic panel being recorded with multiple first holographic patterns each optically configured to diffract only the first light wavelength of the first light diodes emitted at one or more of the respective first emission angles, and the second holographic panel being recorded with multiple second holographic patterns each optically configured to diffract only the second light wavelength of the second light diodes emitted at one or more of the respective second emission angles.

15. A method of assembling a holographic projection display system for projecting images onto a reflective surface, the method comprising:

arranging a cluster of lighting elements in a predefined pattern, the cluster of lighting elements including:

a plurality of first light diodes of a first light wavelength and each having a respective first emission angle towards the reflective surface, and a plurality of second light diodes of a second light wavelength and each having a respective second emission angle towards the reflective surface; and attaching a multilayer holographic optical element (HOE) assembly to the cluster of lighting elements forward of the pluralities of first and second light diodes, the multilayer HOE assembly including:

a first holographic panel recorded with a plurality of first holographic patterns each optically configured to diffract the first light wavelength of the first light diodes emitted at one or more of the respective first emission angles, and a second holographic panel attached to the first holographic panel, the second holographic panel recorded with a plurality of second holographic patterns each optically configured to diffract the second light wavelength of the second light diodes emitted at one or more of the respective second emission angles.

16. The method of claim 15, wherein one of the first holographic patterns only diffracts the first light wavelength emitted at the respective first emission angle of a respective one of the first light diodes, and one of the second holographic patterns only diffracts the second light wavelength emitted at the respective second emission angle of a respective one of the second light diodes.

17. The method of claim 15, wherein the second holographic panel includes an optically transparent region lacking a holographic pattern and overlapping one of the first holographic patterns of the first holographic panel.

18. The method of claim 15, further comprising:

mounting a plurality of first light prisms or reflectors each located adjacent a respective one of the first light diodes and configured to direct a first reference beam emitted therefrom at the respective first emission angle; and mounting a plurality of second light prisms or reflectors each located adjacent a respective one of the second light diodes and configured to direct a second reference beam emitted therefrom at the respective second emission angle.

19. The method of claim 15, wherein arranging the cluster of lighting elements in the predefined pattern includes mounting the pluralities of first and second light diodes in a fixed light array with a single row or multiple rows of diodes.

20. The method of claim 15, wherein the first holographic panel is mounted onto and substantially parallel with the second holographic panel.

* * * * *